UNITED STATES PATENT OFFICE.

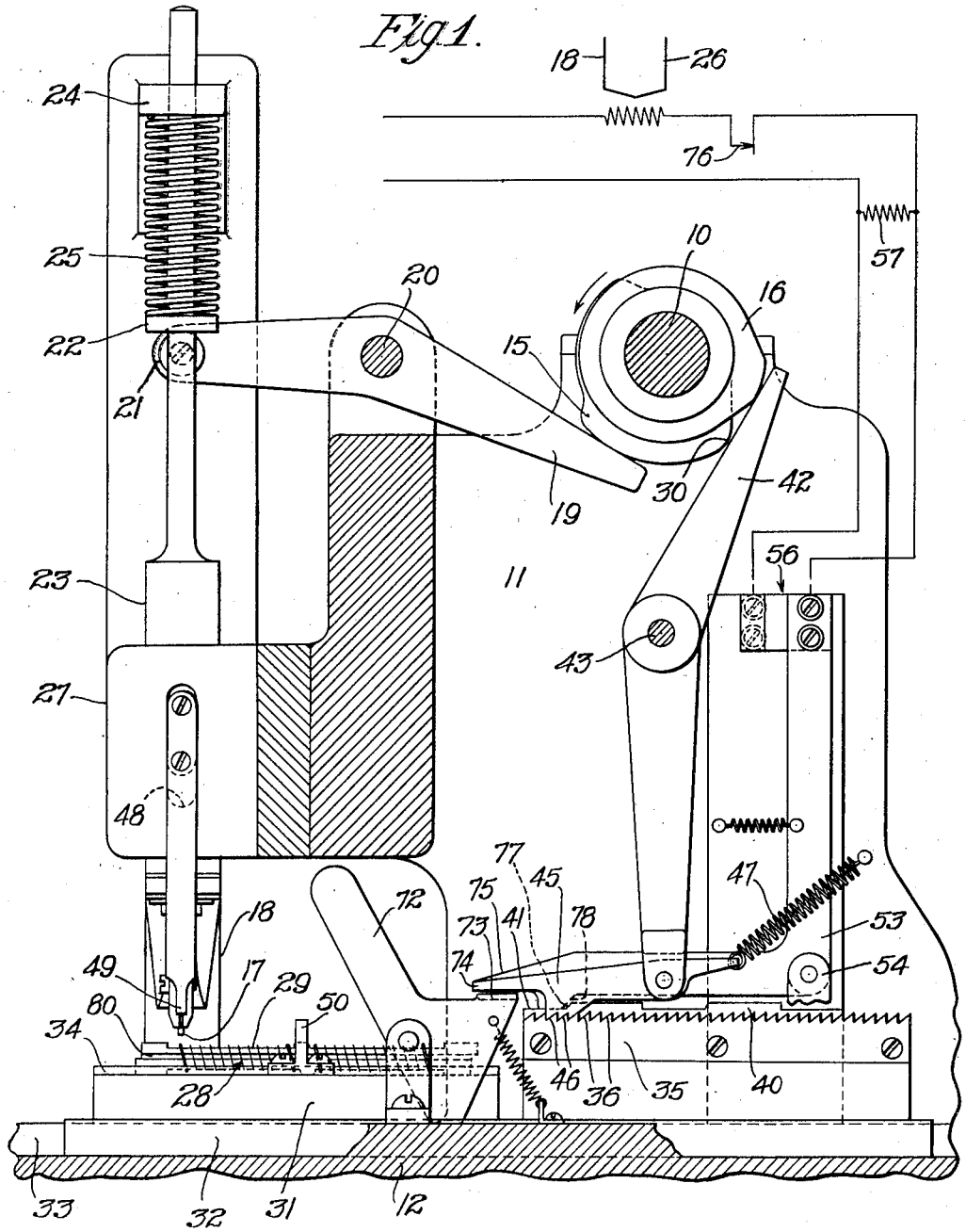

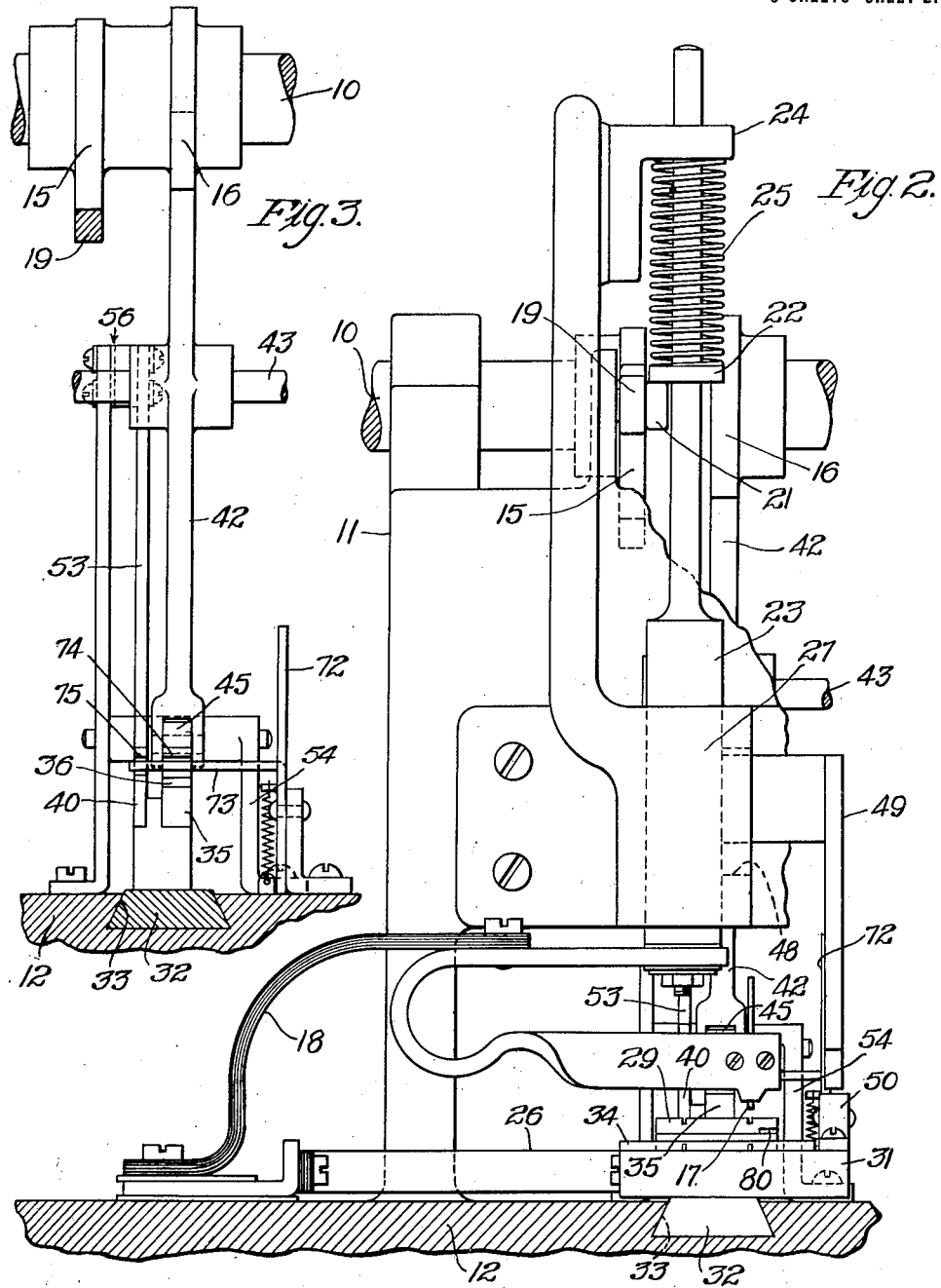

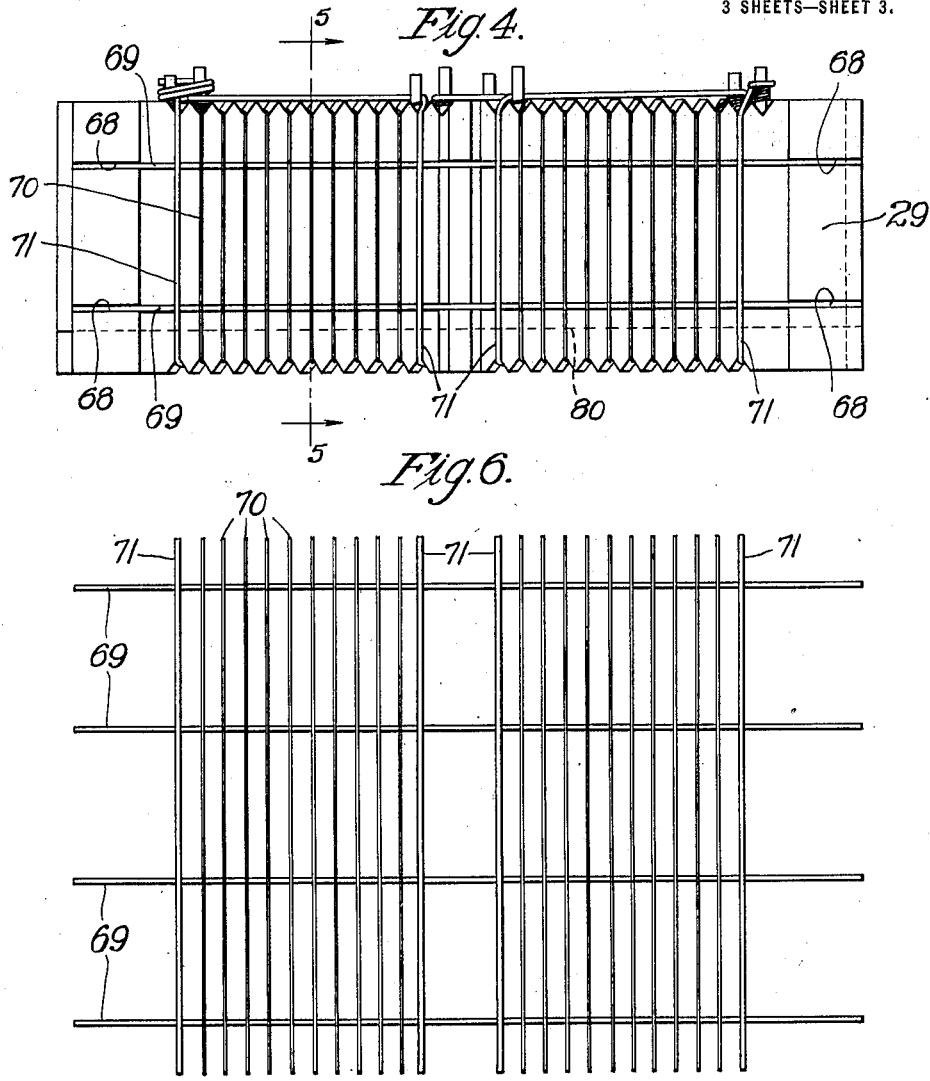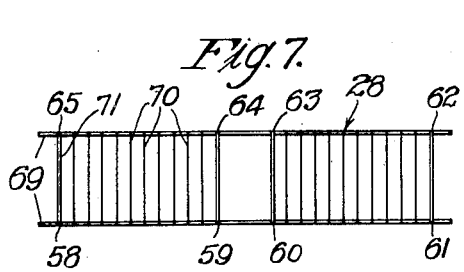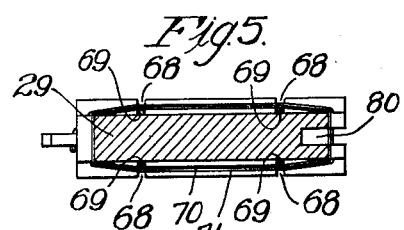

SIGURD THRONSEN, OF CHICAGO, ILLINOIS, ASSIGNOR TO WESTERN ELECTRIC COMPANY, INCORPORATED, OF NEW YORK, N. Y., A CORPORATION OF NEW YORK.

RESISTANCE WELDING-MACHINE.

1,376,657.                        Specification of Letters Patent.        Patented May 3, 1921.

Application filed October 30, 1919.  Serial No. 334,469.

*To all whom it may concern:*

Be it known that I, SIGURD THRONSEN, a citizen of the United States, residing at Chicago, in the county of Cook and State of Illinois, have invented certain new and useful Improvements in Resistance Welding-Machines, of which the following is a full, clear, concise, and exact description.

This invention relates to improvements in resistance welding machines, and has for its object the construction of a machine for facilitating the welding of parts in which the welded portions occur at separated positions over the body of the parts to be welded.

In accordance with the general features of this invention, there is provided a work holding plate adapted to be fed along under a reciprocating electrode to present an unwelded portion under the reciprocating electrode after each welding operation of the electrode. In the preferred form of the invention this is accomplished by an automatically operated feeding means operatively connected with the mechanism which reciprocates the movable electrode, which mechanism causes the work holding device to be fed a predetermined distance after each reciprocation of the movable electrode.

Another feature of this invention relates to the means provided for automatically increasing the amount of current at certain periods where the resistance is less and more current may be required to complete the weld. This feature is secured by the provision of switching mechanism timed with the operation of the work feeding mechanism to cut out a resistance in the welding circuit when the heavier portions to be welded are under the electrode.

Means are also provided for preventing the welding operations at certain points on the work without changing the predetermined movement of the work holding device.

In the drawings illustrating this invention it is shown as operated for producing a welded grid to be used in connection with a certain known form of thermionic device used in electrical wave signaling. It is to be understood, however, that the invention is not limited to the production of this particular form of article.

In the drawings illustrating this invention:

Figure 1 is a fragmentary side elevation, partly in section, of a welding machine embodying the features of this invention, with the electric circuit shown in diagrammatic form;

Fig. 2 is a fragmentary front elevation thereof, partly in section;

Fig. 3 is a fragmentary front elevation taken to the rear of the upper electrode and with a jig for holding the grid removed;

Fig. 4 is an enlarged plan view of a wound jig;

Fig. 5 is a section taken on the line 5—5 of Fig. 4;

Fig. 6 is a plan view of a welded grid removed from the jig and before being trimmed, and Fig. 7 is a plan view of a finished grid.

As shown in the drawings, 10 is a cam shaft which is driven by suitable driving mechanism (not shown). The cam shaft 10 is supported on a frame 11 mounted from a base 12 and has attached thereto cams 15 and 16. The cam 15 controls the lowering of an upper welding electrode 17 which is connected by flexible leads 18 to a suitable source of current. The cam 15 in revolving acts on a lever 19 which is pivotally secured to the frame 11 by a pin 20 and carries a roller 21 at one end which engages a shoulder 22 on a reciprocating electrode carrier 23. Mounted around the electrode carrier 23 above the shoulder 22 and below a lug 24 secured to the frame 11 is a compression spring 25. The electrode carrier 23 is slidably mounted in a boss 27 on the frame 11 and carries at its lower end the electrode 17. As shown in Fig. 1 a further movement of the cam 15 from the position shown and in the direction indicated by the arrow will release the lever 19 thereby allowing the compression spring 25 to move the electrode carrier 23 and the electrode 17 attached thereto down and into engagement with a jig 29 which constitutes a lower electrode. The roller 21 on the lever 19 is always in engagement with the shoulder 22 on the electrode carrier 23 so that when the point 30 of the cam 15 comes into contact with the cam end of the lever 19 it will turn it about the pin 20 and raise the electrode carrier 23 up against the compression of the spring 25.

Below the upper electrode 17 is a jig carrying frame 31 connected to flexible leads 26 which are in turn connected to a suitable source of current. The frame 31 is secured to a plate or slide 32 which is slidable in a key-way 33 formed in the base 12. The jig 29 is held on the jig frame 31 in its proper position by retaining strips 34. Secured to the rear end of the slide 32 is a ratchet bar 35 provided with teeth 36 as best shown in Figs. 1 and 3, and also secured to the slide 32 to one side of the ratchet bar 35 is a cam bar 40 provided with a cam surface 41.

The cam 16 carried on the cam shaft 10 acts on a lever 42 which is pivotally secured to the frame 11 by a pin 43. Pivotally secured to the lower and forked end 44 of the lever 42 is a pawl 45 provided with teeth 46 which engage the teeth 36 on the ratchet bar 35. One end of a spring 47 is attached to one end of the pawl 45 and the other end of the spring is suitably secured to the frame 11. The spring 47 retains the lever 42 in contact with the cam 16 and also keeps the pawl 45 in engagement with the teeth 36 on the ratchet bar 35. As shown in the drawings, particularly in Fig. 1, the electrode is about to be moved down to the first point on the grid 28 to be welded. As the electrode 17 moves down, the lever 42 will be turned about the pin 43 in a counter-clockwise direction due to the movement of the cam 16 and the action of the spring 47. This movement of the lever 42 draws the pawl 45 back one tooth on the ratchet bar 35. When the high point on the cam 16 thereafter comes into engagement with the lever 42 it will turn it in a clockwise direction. This last movement of the lever 42 steps the slide 32 forward a distance equal to one tooth on the ratchet bar, which distance is equal to that between the points to be welded on the grid. Mounted on the electrode carrier 23 and passing through a slot 48 formed in the boss 27 is a stop 49 which engages a stop 50 carried on the jig frame 31 at a point which is the center of the grid.

The purpose of the stops 49 and 50 is to hold the electrode up when the center of the grid is under the electrode 17, at which point cross wires are omitted for a distance equal to two steps of the ratchet.

In another grid or on other work to be welded it may be advisable to prevent welding at other points than that shown on the drawings, in which case the stop 50 would be moved to the correct location.

In engagement with the cam surface 41 of the cam bar 40 is one end of a lever 53 which is pivoted to the supporting bracket 54. The other end of the lever 53 has secured thereto but insulated therefrom a contact of an electric switch 56. The opening or closing of the switch 56 controls the circuit through a resistance 57 in the circuit.

The grid as shown in the drawings requires a heavy weld at the points 58, 59, 60, 61, 62, 63, 64, and 65 due to heavy cross wires at these points. When these points are under the electrode 17 the switch 56 is closed, which causes a heavy current to be used, and when the fine cross wires are to be welded the switch is open which causes the current to traverse the resistance 57.

In the welding of grids for thermionic devices by this mechanism the jig 29 as shown is shaped for the winding of one type of grid. A grid with different spacing of the cross wires would require a different jig, in which case the cams 15 and 16 and the ratchet bar 35 would be removed and others substituted. Laid in notches 68—68 cut in each side and at both ends of the jig 29 are main supporting wires 69. Wound around the jig and over the wires 69 is a fine wire 70, which wire forms the cross wires of the grid with the exception of a heavy wire 71 which is wound at each end and at each side of the center of the grid. The wound jig is now placed on the carrying frame 31 and is properly held thereon by the retaining strips 34. After a grid has been welded the slide 32 is in a forward position, and after loading the frame 31 again with a jig it is necessary to move the slide 32 back to a position where the first point to be welded is under the electrode 17. To do this it is first necessary to raise the pawl 45 from the ratchet bar 34 and the end of the lever 53 which contacts with the cam surface 41. This is conveniently done by rocking a lever 72 forward, an extending part 73 of which comes into contact with forward ends 74 and 75 of the pawl 45 and the ratchet bar 34 to move them upward a sufficient distance to allow the slide 32 to be moved back.

When the wound jig is properly in place with the first point to be welded under the electrode 17 the machine is operated and the cam 15 will revolve to release the electrode 17 and allow it to move down to the work under the action of the spring 25. The first weld of the grid being of heavy wires the switch 56 will not be opened.

The time and duration of the weld is controlled by a switch similar to that disclosed in Patent No. 1,292,892 dated January 28, 1919, and which is operated by the cam shaft 11. In the circuit this switch is denoted by the numeral 76. While the cam 15 is revolving to release the electrode 17 the cam 16 is revolving to allow the lever 42 to draw the pawl 45 backward the distance of one tooth and while the electrode is being moved up, the lever 42 is being acted upon by the cam 16 to move the slide forward the distance of one tooth which movement brings another point to be welded under the electrode, and in case it is fine wires to be welded the switch 56 will be opened to bring the resistance 57 into the circuit. This is caused by the lever 53 being turned about the bracket 54 by the rise 77 in the cam surface 41 coming into contact with the surface 78 of the lever 53. At the center of the grid where two cross wires are omitted, the machine operates in the usual manner except that the electrode 17 does not move all the way down, due to the stop 49 on the electrode carrier engaging the stop 50 on the jig frame 31.

The complete welding of a wound jig comprises four rows of welds, two for each side, and it will readily be seen that by turning the jig over and by reversing the jig end for end in the carrying frame all four rows of welds can be accomplished without changing any part of the machine. After the four rows of welds are done the grid can be removed from the jig by running a suitable cutting tool along the line of a slot 80 formed in the jig. The grid is now removed from the jig and laid flat, as shown in Fig. 6, after which it is trimmed to the correct size. Two grids similar to that illustrated in Fig. 7 result from a wound jig.

What is claimed is:

1. In an electrical welding apparatus, a reciprocating electrode, a slidable plate located beneath said electrode, a work holding jig adapted to be secured to said movable plate to constitute a second electrode, and means for moving said movable plate step by step in consonance with the operation of said reciprocating electrode to present an unwelded portion under said electrode after each welding operation thereof.

2. In an electrical welding apparatus, a reciprocating electrode, means for reciprocating said electrode, a movable work holding device, means for moving said movable work holding device step by step in consonance with the operation of said reciprocating electrode to present an unwelded portion under said electrode after each welding operation thereof, and means associated with said reciprocating electrode and said movable work holding device for preventing welding operations at certain points on the work without changing the step by step movement of said work holding device.

3. In an electric welding apparatus, a reciprocating electrode, means for reciprocating said electrode, a movable work holding device, means for moving said movable work holding device step by step in consonance with the operation of said electrode to present an unwelded portion under said electrode after each welding operation, and means for automatically varying the current strength through said electrodes at different positions of the work holding device.

4. In an electric welding apparatus, a reciprocating electrode, means for reciprocating said electrode, a movable work holding device, means for moving said movable work holding device step by step in consonance with the operation of said electrode, and switching means operated in the movement of said work holding device for varying the current strength through said electrodes at predetermined positions of said work holding device.

5. In an electric welding apparatus, a reciprocating electrode, means for reciprocating said electrode, a movable work holding device constituting the other electrode, a circuit for said electrodes, a resistance for said circuit, means for moving said movable work holding device step by step in consonance with the movement of the reciprocating electrode, and switching means controlled in the movement of said work holding device to cut the resistance into and out of circuit.

In witness whereof I hereunto subscribe my name this 30th day of September, A. D. 1919.

SIGURD THRONSEN.